(12) United States Patent
Cabillic et al.

(10) Patent No.: US 8,381,177 B2
(45) Date of Patent: Feb. 19, 2013

(54) METHOD AND SYSTEM OF PERFORMING JAVA LANGUAGE CLASS EXTENSIONS

(75) Inventors: Gilbert Cabillic, Brécé (FR); Jean-Philippe Lesot, Argentré du Plessis (FR)

(73) Assignee: Texas Instruments Incorporated, Dallas, TX (US)

( * ) Notice: Subject to any disclaimer, the term of this patent is extended or adjusted under 35 U.S.C. 154(b) by 1431 days.

(21) Appl. No.: 11/958,072

(22) Filed: Dec. 17, 2007

(65) Prior Publication Data

US 2009/0089750 A1    Apr. 2, 2009

(30) Foreign Application Priority Data

Sep. 28, 2007   (EP) ..................................... 07291168

(51) Int. Cl.
*G06F 9/44* (2006.01)
(52) U.S. Cl. ........................ 717/108; 719/315
(58) Field of Classification Search ................. 717/108
See application file for complete search history.

(56) References Cited

U.S. PATENT DOCUMENTS

| 6,102,966 A * | 8/2000 | Tyma ............................. 717/110 |
| 6,523,171 B1 * | 2/2003 | Dupuy et al. ................. 717/136 |
| 7,093,242 B2 * | 8/2006 | Bernadat et al. .............. 717/166 |
| 7,185,325 B2 * | 2/2007 | Boyle ............................ 717/147 |
| 7,681,184 B1 * | 3/2010 | Weedon et al. ............... 717/137 |
| 2003/0110446 A1 * | 6/2003 | Nemer .......................... 715/513 |
| 2005/0114394 A1 * | 5/2005 | Kaipa et al. ................. 707/104.1 |
| 2007/0245331 A1 * | 10/2007 | Daynes et al. ................ 717/166 |

* cited by examiner

*Primary Examiner* — Elias Mamo
(74) *Attorney, Agent, or Firm* — Alan A. R. Cooper; Wade J. Brady, III; Frederick J. Telecky, Jr.

(57) ABSTRACT

A method and system of performing Java language class extensions. At least some of the illustrative embodiments are computer-readable mediums storing a program that, when executed by a processor of a host system, causes the processor to identify a first class having a first name, and create a second class based on the first class (the second class is an abstract view of the first class, and the second class has a second name equal to a third name of a third class).

5 Claims, 3 Drawing Sheets

METHOD AND SYSTEM OF PERFORMING JAVA LANGUAGE CLASS EXTENSIONS

CROSS-REFERENCE TO RELATED APPLICATION

The present application claims priority to EP Application No. 07291168.8, filed on Sep. 28, 2007, hereby incorporated herein by reference.

BACKGROUND

Java™ is a programming language that, at the source code level, is similar to object oriented programming languages such as C++. Java language source code is compiled into an intermediate representation based on a plurality of "byte-codes" that define specific actions. In some implementations, the bytecodes are further compiled to machine language for a particular processor. In order to speed the execution of Java language programs, some processors are specifically designed to execute some of the Java bytecodes directly. Many times, a processor that directly executes Java bytecodes is paired with a general purpose processor to accelerate Java program execution.

To aid in the programming of Java, groups of related classes are bundled into class libraries, which are also referred to as packages. Among other uses, packages enable efficient code reusability. A Java Application Programming Interface (API) comprises a plurality of such packages. One exemplary package, the Java language package (java.lang), comprises Java classes such as the object class (java.lang.object) that correspond to a set of classes that enable the execution of Java bytecodes. The Java language classes are provided by the Java API and are unique within any given Java platform. Stated otherwise, each Java API is targeted to only one configuration of a Java Virtual Machine (JVM). It would be desirable to define a methodology that would allow at least some JVM compatibility to any API configuration.

SUMMARY

The problems noted above are solved in large part by a method and system of performing Java language class extensions. At least some of the illustrative embodiments are computer-readable mediums storing a program that, when executed by a processor of a host system, causes the processor to identify a first class having a first name, and create a second class based on the first class (the second class is an abstract view of the first class, and the second class has a second name equal to a third name of a third class).

Other illustrative embodiments are computer systems comprising a processor that executes bytecodes and a memory coupled to the processor. The processor identifies a first class having a first name. The processor creates a second class based on the first class (the second class is an abstract view of the first class, and the second class has a second name equal to a third name of a third class).

BRIEF DESCRIPTION OF THE DRAWINGS

For a more detailed description of the various embodiments, reference will now be made to the accompanying drawings, wherein.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
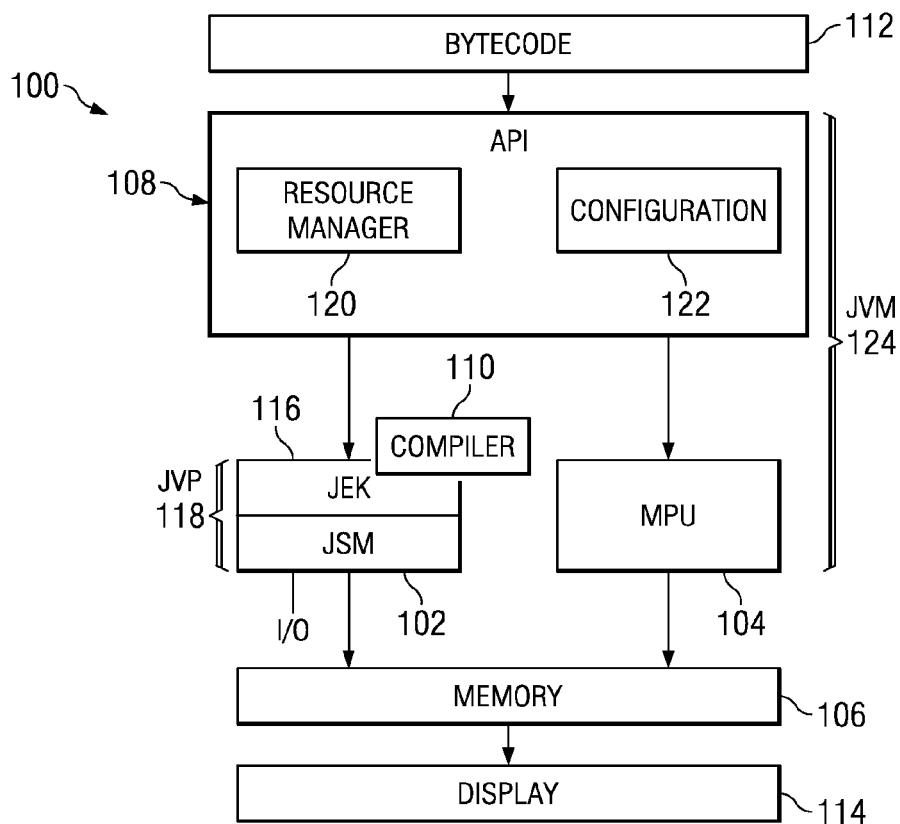
FIG. 1 illustrates a diagram of a system in accordance with embodiments comprising a Java Stack Machine (JSM)

FIG. 1 illustrates a system 100 in accordance with at least some embodiments. In particular, the system 100 comprises at least one processor 102. Processor 102 is referred to for purposes of this disclosure as a Java Stack Machine ("JSM") 102. The JSM 102 comprises an interface to one or more input/output ("I/O") devices such as a keypad to permit a user to control various aspects of the system 100. In addition, data streams may be received from the I/O space into the JSM 102 to be processed by the JSM 102.

Optional processor 104 may be referred to as a Micro-Processor Unit ("MPU"). System 100 may also comprise memory 106 coupled to both the JSM 102 and MPU 104 and thus accessible by both processors. A portion of the memory 106 may be shared by both processors, and if desired, other portions of the memory 106 may be designated as private to one processor or the other. The memory 106 may be further coupled to a display 114.

System 100 also comprises a Java virtual machine (JVM) 124. The JVM 124 may comprise an Application Programming Interface implementation (API) 108 and a Java Virtual Processor (JVP) 118 (discussed more below). The API implementation 108 comprises a resource manager 120 and a configuration 122. The resource manager 120 manages resource sharing between multiple threads and/or applications running on the system 100. The configuration 122 provides applications with an API, which API is used to access base functionalities of the system.

The JVP 118 may comprise a combination of software and hardware. The software may comprise a compiler 110 and a JSM Execution Kernel (JEK) 116. The JEK 116 comprises software that is executable within the JSM 102, such as a class loader, bytecode verifier, garbage collector, and firmware to interpret the bytecodes that are not directly executed on the JSM processor 102. Thus, the hardware of the JVP 118 may comprise the JSM 102. The JVP 118 provides a layer of abstraction between the API 108 and a physical hardware platform (e.g., JSM 102) that executes Java bytecodes. Other components may be present as well.

Java language source code is converted or compiled to a series of bytecodes 112, with each individual one of the bytecodes referred to as an "opcode." Bytecodes 112 may be provided to the JEK 116, possibly compiled by compiler 110, and provided to the JSM 102. When appropriate, the JVP 118 may direct some method execution to the MPU 104.

The MPU 104 also may execute non-Java instructions. For example, the MPU 104 may host an operating system (O/S) which performs various functions such as system memory management, system task management and most or all other native tasks running on the system, management of the display 114, and receiving input from input devices. Java code, executed on the JVP 118, may be used to perform any one of a variety of applications such as multimedia, games or web based applications in the system 100, while non-Java code, which may comprise the O/S and other native applications, may run on the MPU 104.

As discussed above, the JVP 118 provides a layer of abstraction. In particular, the JVP 118 is a virtual hardware platform that is compatible with any Java API, any real hardware/software platform that may comprise a JSM processor, or any JVM implementation. In some exemplary embodiments, the JVP 118 comprises a JEK core that has an execution engine, a memory management component, and a compiler. The execution engine may comprise a Bytecode engine, a class loader, a notification manager, and an external method interface. The memory management component may comprise a memory allocator, an object mapper for physically constrained objects, a garbage collector, a memory defragmentor, and a swapper. The compiler may comprise a dynamic compiler and provide code buffer management. The JEK core may also comprise firmware to facilitate the execution of Java Bytecodes on the JSM processor.

The JVP 118 also provides the API 108 with methods to create software class loaders. A class loader loads classes used by an application at runtime. Other hardware components of the hardware platform or software components are virtualized within the JEK 116 as Java Virtual Devices (JVD) that communicate with the JEK core. Each JVD comprises some combination of fields, methods, and notifications. The fields may comprise standard Java fields or may be mapped to a predefined or constrained physical memory space, wherein the constraint may be due to hardware or software. The fields may also comprise a map to indirect memories. The methods may comprise standard bytecodes or may comprises JSM native code, hardware instructions, or may use any kind of native interface such as a Java Native Interface (JNI) or a KVM Native Interface (KNI). The notifications may be initiated by an event, for example, a hardware interrupt, or from software. Additionally, the JEK core manages native interface links and the notification mechanism provides a way to implement flexible monitoring.

To aid in the programming of Java, groups of related classes are bundled into class libraries, which are also referred to as a packages. Among other uses, packages enable efficient code reusability. The Java API comprises a plurality of such packages. One exemplary package, the Java language package (java.lang), comprises Java classes such as the object class (java.lang.object) that correspond to a set of classes that enable the execution of Java bytecodes. Classes may define attributes and behaviors. Behaviors are referred to as methods, and classes may comprise one or more methods that define all the behaviors available within a given class. For example, methods may request performing of an action such as setting a value, returning a value, or writing to a file. The object class (java.lang.object) is at the top of the class hierarchy, and every other class inherits (either directly or indirectly) attributes and methods from the object class. In other words, the object class is a superclass for all other classes in a given Java system.

Figure 2:
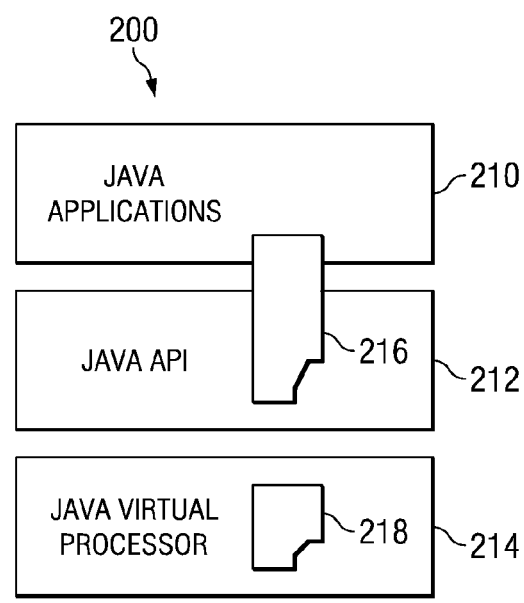
FIG. 2 illustrates a first system in accordance with some embodiments of the invention.

FIG. 2 illustrates a system 200 that comprises a Java API 212 and a JVP 214. The API 212 comprises at least one class loader that loads classes used at runtime by Java applications 210. One exemplary class loaded by one of the class loaders of the API 212 is the object class 216 of the Java language package. As discussed above, the JVP 214 comprises the JSM and the JEK. The JVP 214 also comprises at least one class loader that may be used to load classes at runtime. In embodiments of the present invention, the JEK realizes its own limited Java API configuration (that can be used to execute itself). Thus, one of the JVP 214 class loaders has the capability to load its own object class 218 by way of the JEK. However, the object class 218 to be loaded by the JVP 214 is not necessarily the same object class 216 that the API 212 class loader provides to the applications 210 during program execution. In effect, there could be two different "local" versions (that may have the same name) of the object class (or any other class such as those classes of the Java language package). This raises a potential conflict since language classes are unique within any given Java system. To avoid this potential conflict, a class loader may filter classes (as discussed below) belonging to the Java language package such as the object class (java.lang.object). In some embodiments, the class loader may filter classes belonging to other distinct Java packages. The result of the filtering is that a new class (such as a new object class) is created (which is an abstract view of an already existing class), and conflicts can be avoided while the JVP 214 maintains compatibility with any Java API 212.

Figure 3A:
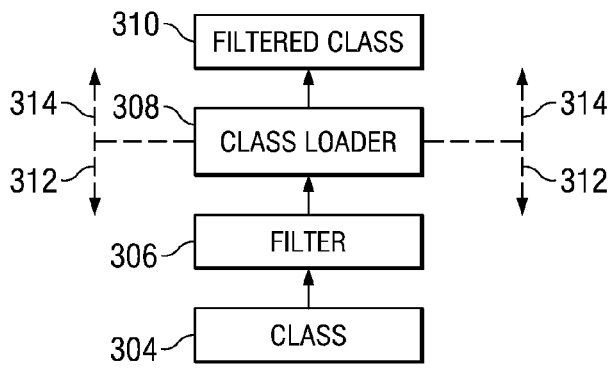
FIG. 3 illustrates a method of filtering a class in accordance with embodiments of the invention.
Figure 3B:
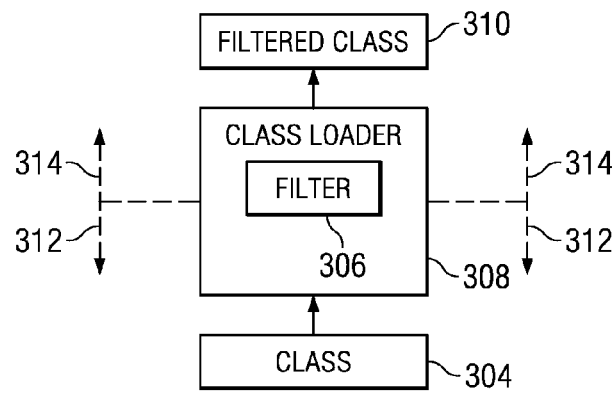

Through the process of filtering, a class loader may abstract the "view" of an existing class, where the view is defined as the manner in which a Java application sees (or handles) a particular Java class. FIG. 3 illustrates a method of filtering a class by way of a class loader. In particular, the class loader may define a new filtered class as a "filtered view" of another already defined class. In some exemplary embodiments, the class loader performing the filtering is implemented by the JVP. As shown in FIG. 3A, a class loader 308 retrieves a class 304 and passes it through a filter 306, resulting in a filtered class 310. The area indicated by arrows 312 may be referred to as the "view", and the area indicated by arrows 314 may be referred to as the "filtered view". Thus, the filtering of a class 304 creates a filtered class 310 which is a filtered view of the unfiltered class 304. In some embodiments the filtering may be accomplished by a set of Java annotations (i.e., a set of modifiers), where the annotations may be applied to a class, a class member, or a method parameter in order to modify its top level view. An example of an annotation is a "name" annotation, which allows for the renaming of a class, field, or a method. Thus, a filtered class may be a renamed version of an unfiltered class, where the filtered class has a "filtered name". Classes, fields, or methods that do not have a name annotation keep their original name. Another example of an annotation is a "visibility" annotation, which allows changing the visibility of a class, field, or a method. For example, in embodiments of the present invention, only classes that have an appropriate visibility annotation will be available to Java applications during runtime. Classes, fields, or methods that do not have a visibility annotation are by default considered to be invisible with respect to the Java applications and to the filtered classes. In other words, only classes within the filtered view 314 are accessible (i.e., visible) to the Java applications and to other filtered classes. The filtering process in not restricted to renaming or changing the visibility of an individual or group of classes, fields, or methods. In some embodiments, other distinct modifiers can be applied to any individual or group of classes, fields, or methods. In addition, the filtering process is not restricted to Java annotations. For instance, in alternative embodiments, filtering may be accomplished by way of extensible markup language (XML) files or a dedicated JVP API. FIG. 3B illustrates a method similar to that of FIG. 3A, where the class loader 308 retrieves and filters the class 304 resulting in a filtered class 310. However, in FIG. 3B, the filter 306 is comprised within the class loader 308.

Figure 4:
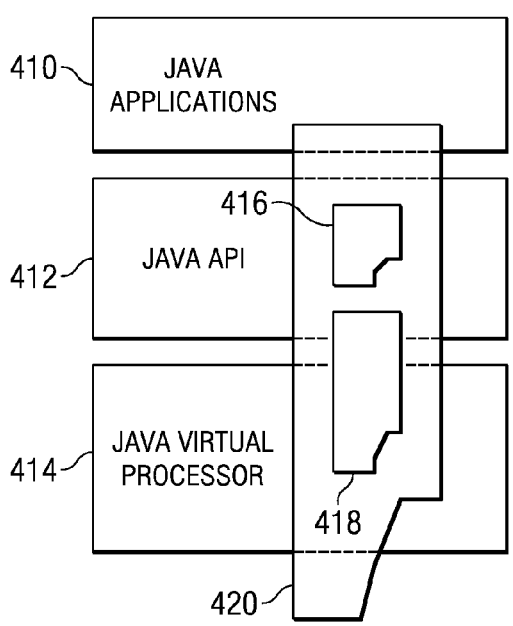
FIG. 4 illustrates a second system in accordance with embodiments of the invention.

FIG. 4 illustrates a system 400 which implements a view abstraction method based on class filtering of the various embodiments. The system 400 comprises a Java API 412, and a JVP 414 which comprises the JSM and the JEK. The API 412 comprises at least one class loader that loads classes used at runtime by Java applications 410. The JVP 414 also comprises at least one class loader that may be used to load classes at runtime. Consider again the object class (java.lang.object), where the Java applications 410 and the JVP 414 each use their own "local" versions of the object class. In particular, the JVP 414 defines object class 418 that is used by both the API 412 and the JVP 414. The API 412 also uses object class 416 to define a filtered object class 420 (discussed below) that is used by the Java applications 410. In other embodiments, the Java applications 410 or the JVP 414 may use any other class such as those classes of the Java language package. In any case, having two different versions of the same class with the same name (e.g., two versions of the object class java.lang.object) poses a potential conflict since language classes are unique within any given Java system.

The view abstraction method carried out by the system 400 of FIG. 4 may be implemented according to various embodiments. In some exemplary embodiments, the object class 416 is programmed with a name such as myconf.lang.object prior to runtime. As described with reference to FIG. 3, the class loader of the JVP 414 retrieves and filters the class myconf.lang.object (i.e., the object class 416) such that a new filtered class 420 is created, where the filtered class 420 is a filtered view (i.e., an abstract view) of myconf.lang.object (i.e., the object class 416) of the API 412. The filtering process may also perform a renaming such that the filtered class 420 has a different name than the object class 416 from which it was derived. In the present example, the filtered class 420 is named "java.lang.object" while the unfiltered object class 416 retains its original name of "myconf.lang.object". Moreover, the filtering process may change the visibility of a class. For example, the applications 410 may access (i.e., view) the renamed, filtered class 420 (java.lang.object) based on appropriate visibility annotations that have been applied during the filtering process. Java.lang.object (object class 418) remains as the only "real" language class; however, the object class 418 remains invisible to the Java applications 410 since classes that do not have a visibility annotation are by default considered to be invisible with respect to the Java applications 410 as well as to the filtered class 420 (as discussed above). In addition, the object class 416 remains invisible to the Java applications 410 since it remains within the unfiltered view (i.e., view 312 of FIG. 3). Thus, by this filtering method, the object class 416 (myconf.lang.object) that the API 412 intended to provide to the applications 410 is still provided by way of the filtered class 420. Additionally, potential conflicts with the object class 418 (java.lang.object) are avoided. In some exemplary embodiments, following a similar view abstraction method as described with respect to FIG. 4, the object class 418 of the JVP 414 may be provided to the applications 410 by way of the filtered class 420. For purposes of this disclosure, the filtered class 420 may be referred to as a "global" class. The term global here does not mean that the filtered class 420 may be accessed across an entire Java system such as system 400 (in fact, the filtered class 420 is only visible to the applications 410). Rather, the term global is used to describe the fact that the abstract filtered class 420 can be used to provide (to the applications 410) any of a plurality of classes from the API 412 or from the JVP 414 while avoiding potential conflicts (e.g., with the object class 418).

The filtered class 420 is not a new class. Rather, the filtered class 420 is an abstract view of the object class 416, as discussed above. Consequently, an instance of the object class 416 is "compatible" with an instance of the filtered class 420, where compatible is defined as having the same structure in memory (e.g., the same fields at the same offset). For example, in FIG. 4, an instance of the object class 416 is viewed in the API 412 as an instance of the object class 416, and the same instance of the object class 416 is viewed in the Java applications 410 as an instance of the filtered class 420. Thus, an instance of the object class 416 created in API 412 could be passed to the Java applications 410 or an instance of the filtered class 420 created in the Java applications 410 could be passed to the API 412. There is no overhead at runtime to access fields or invoke methods of an instance of the object class 416 in the API 412 nor in the Java applications 410. The filtered class 420 remains a pure abstract view of the object class 416, which describes the instance and remains as a real class.

Figure 5:
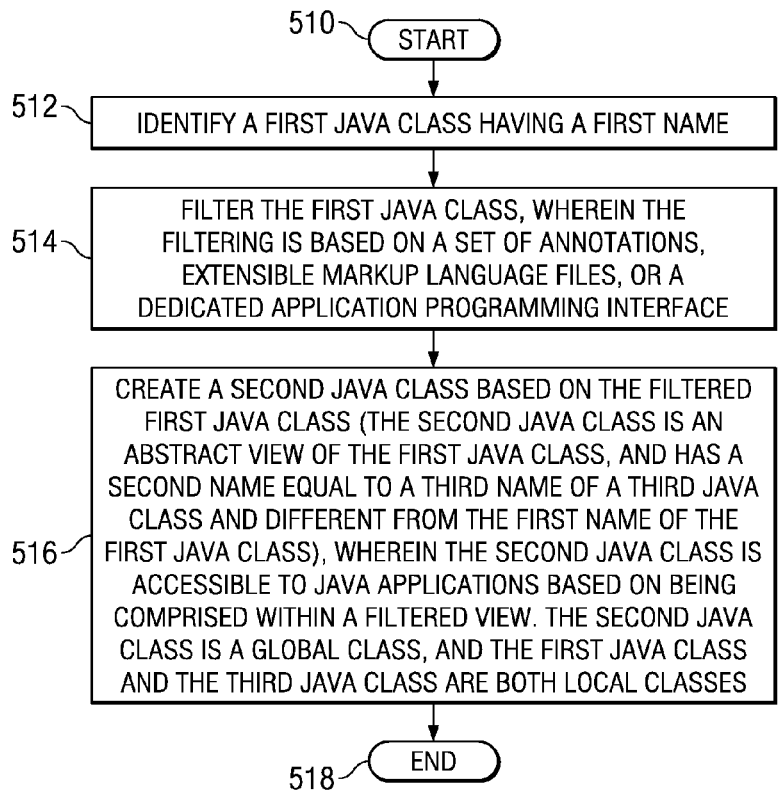
FIG. 5 illustrates a method in accordance with embodiments of the invention.

FIG. 5 illustrates a method (e.g., software) in accordance with some embodiments. In particular, the process starts (block 510) and proceeds to identify a first Java class having a first name (block 512). The first Java class may be an object class or any other class such as those classes of the Java language package. The first Java class is then filtered (block 514). The filtering is based on a set of annotations, extensible markup language (XML) files, or a dedicated application programming interface. The process then proceeds to create a second Java class based on the filtered first Java class (block 516). The second Java class is an abstract view of the first Java class, and has a second name equal to a third name of a third Java class. In some exemplary embodiments, the second name may be different than the third name. The second name is also different than the first name of the first Java class. The second Java class is also accessible (i.e., viewable) to Java applications based on the second Java class being comprised within a filtered view (area indicated by arrows 314 of FIG. 3). Furthermore, the second Java class is a "global" class (as described above), and the first Java class and the third Java class are both local classes. Also, since the first Java class and the third Java class are not comprised within the filtered view, they are not directly accessible to the Java applications. The process then ends (block 518).

Figure 6:
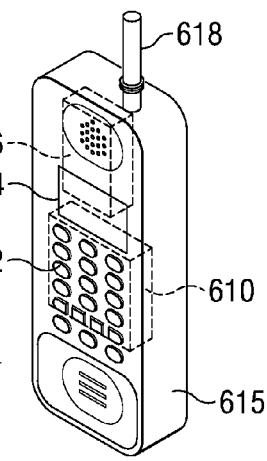
FIG. 6 illustrates a system in accordance with at least some embodiments of the invention.

System 100 (FIG. 1) may be implemented as a mobile cell phone such as that shown in FIG. 6. As shown, the mobile communication device has an outer enclosure 615 and includes an integrated keypad 612 and display 614. The JSM processor 102 and MPU processor 104 and other components may be included in electronics package 610 connected to the keypad 612, display 614, and radio frequency (RF) circuitry 616. The RF circuitry 616 may be connected to an antenna 618.

From the description provided herein, those skilled in the art are readily able to combine software created as described with appropriate general purpose or a special purpose computer hardware to create a computer system and/or computer subcomponents embodying aspects of the invention, to create a computer system and/or computer subcomponents for carrying out the method embodiments of the invention, and/or to create a computer-readable medium storing a software program to implement method aspects of the various embodiments. Moreover, the embodiments of the illustrative methods could be implemented together in a single program (with various subroutines), or split up into two or more programs executed on the processor.

While various embodiments of the invention have been shown and described, modifications thereof can be made by one skilled in the art without departing from the spirit and teachings of the invention. The embodiments described herein are illustrative only, and are not intended to be limiting. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing a program that, when executed by a processor of a host system, causes the processor to:
   identify a first JAVA class having a first name; and
   create a second class based on the first class, wherein the second class is an abstract view of the first JAVA class, and wherein the second class has a second name equal to a third name of a third class
   wherein the program further causes the processor to filter the JAVA first class, wherein the filtering is based on at least one selected from the group consisting of: extensible markup language files; or a dedicated application programming interface,
   wherein the program further causes the processor to create the second class, wherein the second class is comprised within a filtered view,
   wherein the second class is accessible to software applications based on being comprised within the filtered view,
   wherein the second class has a different name than the first name of the JAVA first class; and
   wherein the second class is only a global class, wherein the JAVA first class is a local class, and wherein the third class is a local class.

2. The computer-readable medium according to claim 1 wherein the program further causes the processor to filter one or more from the group consisting of: the JAVA first class; a field; and a method, and wherein the filtering changes one or more from the group consisting of: a name; and a visibility.

3. A computer system comprising:
   a processor that executes bytecodes of JAVA; and
   a memory coupled to the processor;
   wherein the processor identifies a JAVA first class having a first name; and
   wherein the processor creates a second class based on the first class, wherein the second class is an abstract view of the first class, and wherein the second class has a second name equal to a third name of a third class,
   wherein the processor executes a JAVA class loader, wherein the JAVA class loader identifies the JAVA first class,
   wherein the JAVA class loader filters the JAVA first class,
   wherein the JAVA class loader creates the second class,
   wherein the JAVA class loader provides classes to an application at runtime by way of the second class,
   wherein the processor creates the second class based on a set of annotations,
   wherein the second class is comprised within a filtered view,
   wherein the second class is accessible to software applications based on being comprised within the filtered view,
   wherein the second class is a global class, wherein the JAVA first class is a local class, and wherein the third class is a local class, wherein the global class is defined as an abstract filtered class that can be used to provide to JAVA applications any of a plurality of classes from a JAVA application programming interface or from a JAVA virtual processor while avoiding potential conflicts,
   wherein the processor filters the JAVA first class.

4. The computer system according to claim 3 further comprising wherein the processor creates the second class, wherein the processor creates the second class based on at least one selected from the group consisting of: extensible markup language files; or a dedicated application programming interface.

5. The computer system according to claim 3 further comprising wherein the processor filters one or more from the group consisting of: the JAVA first class; a field; and a method, and wherein the filtering changes one or more from the group consisting of: a name; and a visibility.

* * * * *